United States Patent
Chan et al.

(10) Patent No.: US 11,880,473 B2
(45) Date of Patent: Jan. 23, 2024

(54) REMOVING DATA HAVING A DATA TYPE FROM A DATA SET

(71) Applicant: International Business Machines Corporation, Armonk, NY (US)

(72) Inventors: Yuk Lung Chan, Rochester, NY (US); Tian Wu, Beijing (CN); Lei Yu, Sleepy Hollow, NY (US); Jia Qi Li, Beijing (CN); Hong Min, Hopewell Junction, NY (US); Fan Jing Meng, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 145 days.

(21) Appl. No.: 17/482,533

(22) Filed: Sep. 23, 2021

(65) Prior Publication Data
US 2023/0093666 A1   Mar. 23, 2023

(51) Int. Cl.
| | | |
|---|---|---|
| G06F 21/60 | (2013.01) | |
| G06F 40/211 | (2020.01) | |
| G06F 40/169 | (2020.01) | |
| G06F 40/186 | (2020.01) | |
| G06N 20/00 | (2019.01) | |

(52) U.S. Cl.
CPC ............ *G06F 21/60* (2013.01); *G06F 40/169* (2020.01); *G06F 40/186* (2020.01); *G06F 40/211* (2020.01); *G06N 20/00* (2019.01)

(58) Field of Classification Search
CPC ...... G06F 40/186; G06F 40/169; G06F 21/60; G06F 40/211; G06N 20/00
See application file for complete search history.

(56) References Cited

U.S. PATENT DOCUMENTS

| 8,069,053 | B2 | 11/2011 | Gervais |
|---|---|---|---|
| 9,886,584 | B2 | 2/2018 | Ben |
| 10,579,351 | B2 | 3/2020 | Groseclose |
| 10,713,390 | B2 | 7/2020 | Anderson |
| 10,762,240 | B2 | 9/2020 | Reed |
| 11,080,294 | B1 | 8/2021 | Johnston et al. |
| 11,243,834 | B1 | 2/2022 | Mandal et al. |
| 2006/0005017 | A1 | 1/2006 | Black |
| 2010/0229150 | A1 | 9/2010 | Stone et al. |
| 2011/0239113 | A1 | 9/2011 | Hung |

(Continued)

OTHER PUBLICATIONS

Zhang et al. "A novel neural sougrce code representation based on abstract syntax tree." 2019 IEEE/ACM 41st International Conference on Software Engineering (ICSE). IEEE, 2019; 12 pages.

(Continued)

*Primary Examiner* — Kyle R Stork
(74) *Attorney, Agent, or Firm* — CANTOR COLBURN LLP; Teddi Maranzano

(57) ABSTRACT

Embodiments of the invention are directed to annotating a log based on processing log documentation. Aspects include obtaining the data set and obtaining a set of templates, wherein one or more template of the set of templates includes a variable labeled as the data type. Aspects also include annotating the data set based on the set of templates, wherein the annotating includes labeling each value of the variable in the data set with the data type. Aspects further include creating an updated data set by replacing each value of the variable in the data set that is labeled with the data type with a new data value.

20 Claims, 7 Drawing Sheets

(56) References Cited

U.S. PATENT DOCUMENTS

| | | |
|---|---|---|
| 2012/0233671 A1 | 9/2012 | Beder |
| 2014/0282373 A1 | 9/2014 | Garza |
| 2016/0102881 A1 | 4/2016 | Kim et al. |
| 2017/0075932 A1 | 3/2017 | Wang et al. |
| 2018/0329883 A1 | 11/2018 | Leidner et al. |
| 2019/0130009 A1 | 5/2019 | McLean |
| 2019/0286716 A1 | 9/2019 | Lin et al. |
| 2019/0311022 A1* | 10/2019 | Fan ........................ G06F 40/166 |
| 2019/0392176 A1 | 12/2019 | Taron |
| 2020/0192785 A1 | 6/2020 | Chen |
| 2021/0037032 A1* | 2/2021 | Soeder .................... H04L 63/20 |
| 2022/0091916 A1 | 3/2022 | Liu et al. |

OTHER PUBLICATIONS

Chen et al., "Code summarization with abstract syntax tree." International Conference on Neural Information Processing. Springer, Cham, 2019, 8 pages.

Farrugia et al. "Improved breast cancer care quality metrics after implementation of a standardized tumor board documentation template." Journal of oncology practice 11.5 (2015): 421-423.

Leander et al. "Design and Implementation of a Novel Electronic Health Record Tool to Enhance the Care of Individuals with Cystic Fibrosis: The Cystic Fibrosis Note Template." ACI Open 3.01 (2019): e26-e36.

List of IBM Patents or Patent Applications Treated as Related; Date Filed: Sep. 23, 2021, 2 pages.

Liu et al., "Log System Based on Software Testing System Design And Implementation." 2015 4th International Conference on Mechatronics, Materials, Chemistry and Computer Engineering. Atlantis Press, 2015; 7 pages.

Yuk Lung Chan et al., "Annotating a Log Based on Log Documentation ", U.S. Appl. No. 17/482,531, filed Sep. 23, 2021.

Kobayashi et al., "Towards an NPL-based log template generation algorithm for system log analysis,"ACM, Jun. 18, 2014, pp. 1-4. (Year:2014).

* cited by examiner

REMOVING DATA HAVING A DATA TYPE FROM A DATA SET

BACKGROUND

The present invention generally relates to analyzing and annotating a data set, and more specifically, to removing data having a data type from a data set.

In modern computer systems, log messages are a primary source for system diagnosis and status checking. In general, log messages are in the form of unstructured text data and include dynamic contents, which can vary between systems, workloads, and time periods. When system logs are collected from an environment, the logs often include sensitive information (e.g., personal identification information, company details) such as Hostname, User ID, User's real name, birthday, or social security number. This type of information must be handled carefully because of GDPR, security, and other industrial/company regulations.

SUMMARY

Embodiments of the present invention are directed to a computer-implemented method for removing data having a data type from a data set. A non-limiting example of the computer-implemented method includes obtaining the data set and obtaining a set of templates, wherein one or more template of the set of templates includes a variable labeled as the data type. The method also includes annotating the data set based on the set of templates, wherein the annotating includes labeling each value of the variable in the data set with the data type. The method further includes creating an updated data set by replacing each value of the variable in the data set that is labeled with the data type with a new data value.

Embodiments of the present invention are directed to a system removing data having a data type from a data set. A non-limiting example of the system includes a processor communicative coupled to a memory, the processor configured to obtain the data set and a set of templates, wherein one or more template of the set of templates includes a variable labeled as the data type. The processor is also configured to annotate the data set based on the set of templates, wherein the annotating includes labeling each value of the variable in the data set with the data type. The processor is further configured to create an updated data set by replacing each value of the variable in the data set that is labeled with the data type with a new data value.

Embodiments of the invention are directed to a computer program product for removing data having a data type from a data set, the computer program product comprising a computer readable storage medium having program instructions embodied therewith. The program instructions are executable by a processor to cause the processor to perform a method. A non-limiting example of the method includes obtaining the data set and obtaining a set of templates, wherein one or more template of the set of templates includes a variable labeled as the data type. The method also includes annotating the data set based on the set of templates, wherein the annotating includes labeling each value of the variable in the data set with the data type. The method further includes creating an updated data set by replacing each value of the variable in the data set that is labeled with the data type with a new data value.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
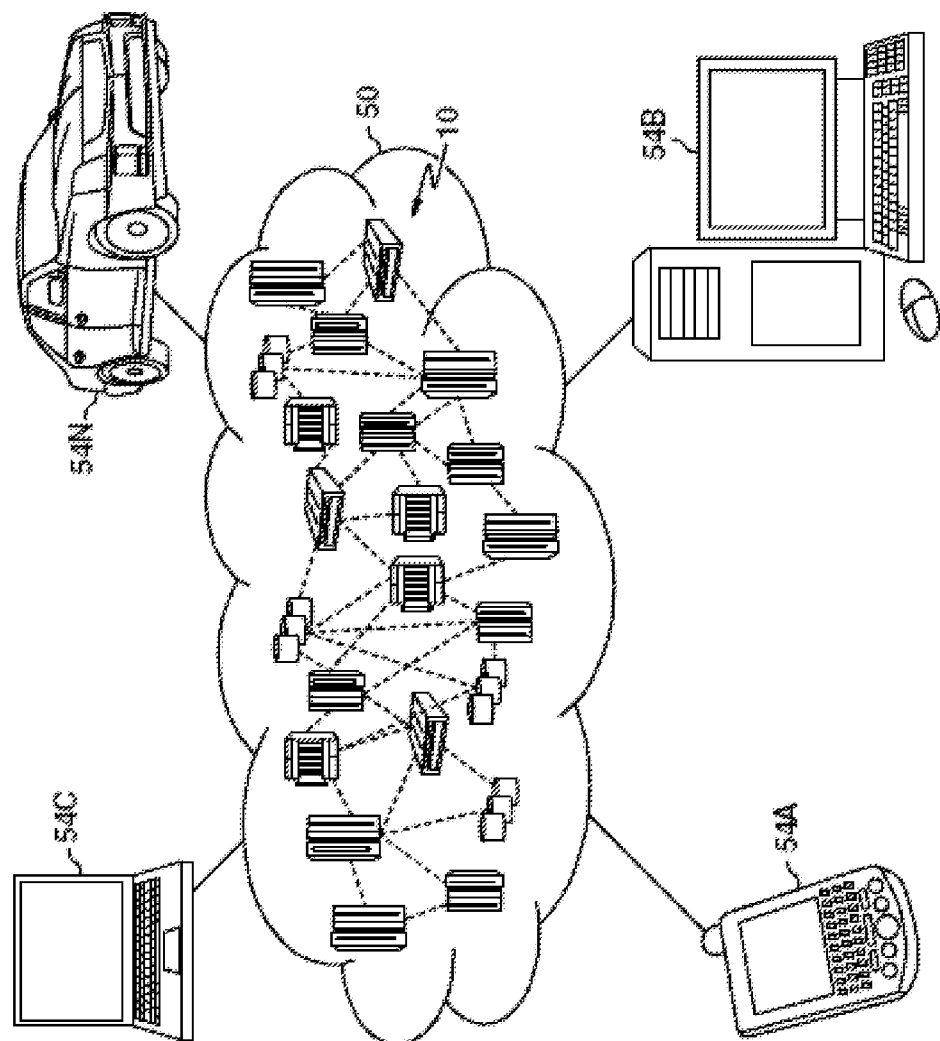
FIG. 1 depicts a cloud computing environment according to one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

As discussed above, data sets, such as logs generated by information technology equipment, often include sensitive information (e.g., personal identification information, company details) such as Hostname, User ID, User's real name, birthday or social security number. This type of information must be handled carefully because of GDPR, security, and other industrial/company regulations. and include dynamic contents, which can vary between systems, workloads, and time periods. Currently, data analysis techniques such as natural language processing and dictionary lookup are used to identify the sensitive information in these data sets. However, due to the unstructured and dynamic nature of some large data sets, these techniques are limited.

Exemplary embodiments provide methods, systems, and computer program products for removing data having a data type from a data set. In exemplary embodiments, documentation that is associated with the data set is analyzed to create a set of templates, which are in turn used to parse and annotate the data set. It is often the case that the computing equipment, software, and/or hardware that creates log messages has an associated set of documentation that includes an explanation of the structure and content of the log messages created by the computing equipment. In exemplary embodiments, this documentation, referred to herein as log documentation, is processed to create a set of templates that are used to annotate log messages in the log. While the data sets discussed herein refer mainly to computing logs, it will be appreciated by those of ordinary skill in the art that the data sets are not limited to computing logs and can include any other type of data set.

As used herein a template is an abstraction of a print statement in a data set that includes a set of constant keywords (tokens without the < >) and parameters (tokens surrounded by < >). One example of a template is: ARC0161I MIGRATION PREPROCESSING VOLUME <P>, SGROUP=<P> FOR USER <P>, REQUEST <P>. Actual log entries are represented by the templates whose parameter is replaced with actual values generated during software executions.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
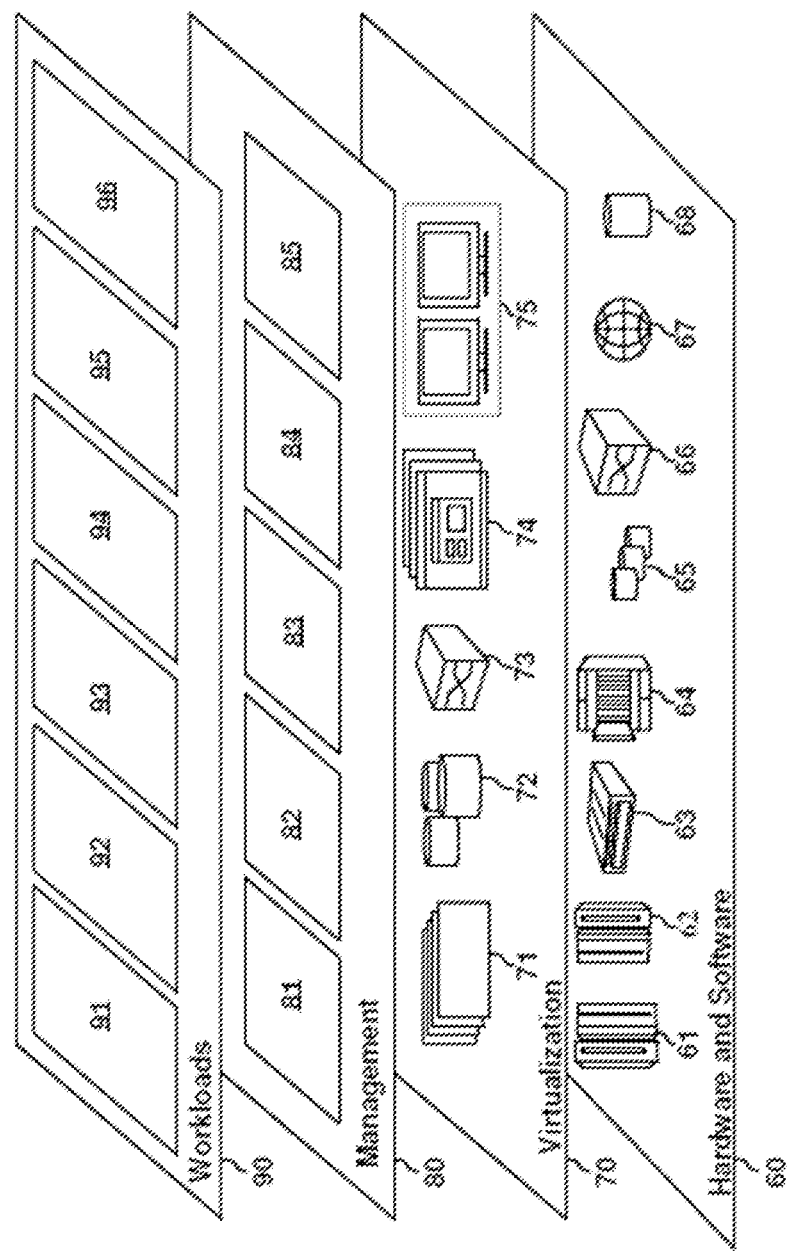
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and removing data having a data type from a data set 96.

Figure 3:
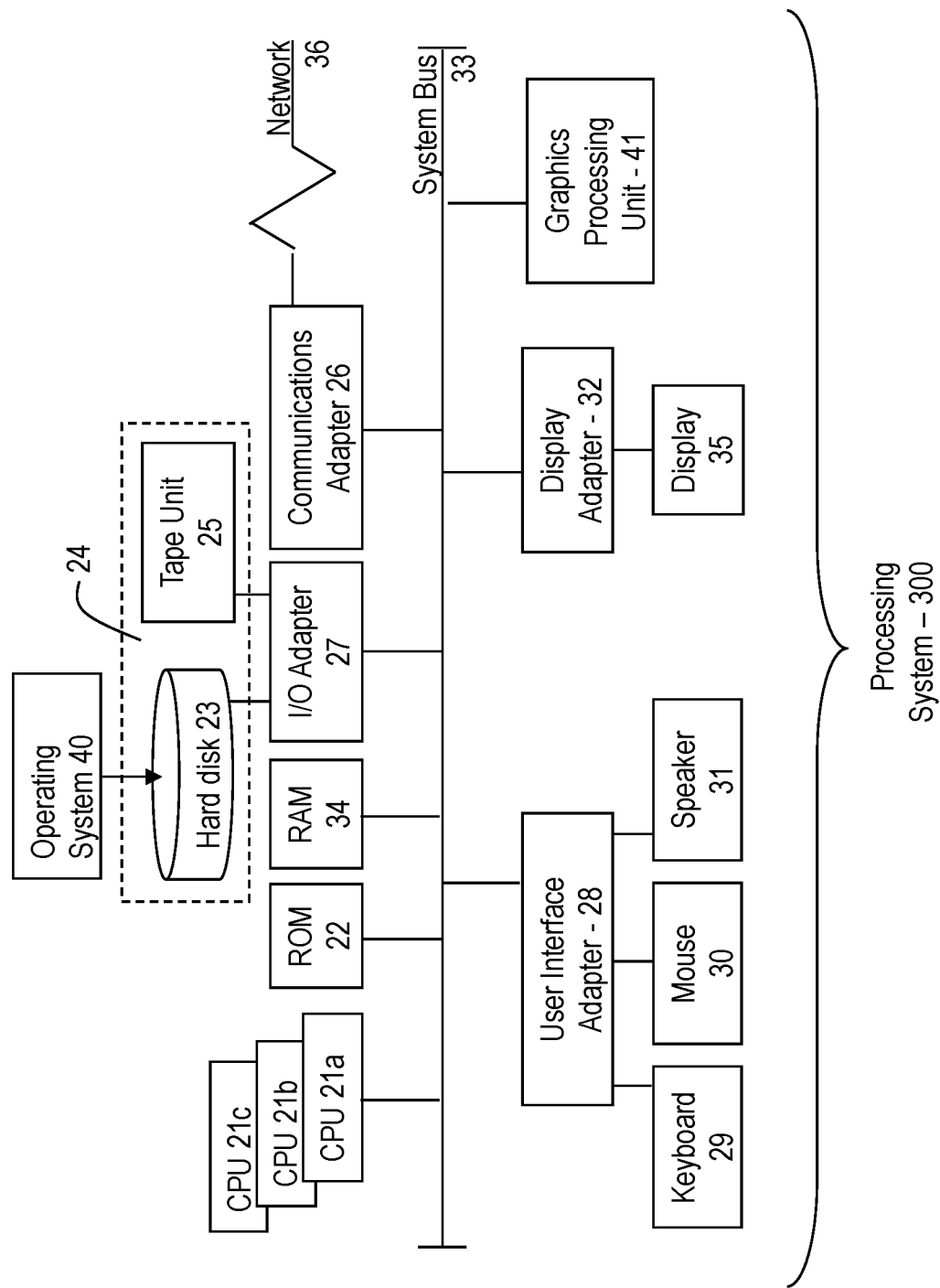
FIG. 3 depicts a block diagram of a computer system for use in implementing one or more embodiments of the present invention.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 34 and various other components via a system bus 33. Read only memory (ROM) 22 is coupled to the system bus 33 and may include a basic input/output system (BIOS), which controls certain basic functions of system 300.

FIG. 3 further depicts an input/output (I/O) adapter 27 and a network adapter 26 coupled to the system bus 33. I/O adapter 27 may be a small computer system interface (SCSI) adapter that communicates with a hard disk 23 and/or tape storage drive 25 or any other similar component. I/O adapter 27, hard disk 23, and tape storage device 25 are collectively referred to herein as mass storage 24. Operating system 40 for execution on the processing system 300 may be stored in mass storage 24. A network adapter 26 interconnects bus 33 with an outside network 36 enabling data processing system 300 to communicate with other such systems. A screen (e.g., a display monitor) 35 is connected to system bus 33 by display adaptor 32, which may include a graphics adapter to improve the performance of graphics intensive applications and a video controller. In one embodiment, adapters 27, 26, and 32 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 28 and display adapter 32. A keyboard 29, mouse 30, and speaker 31 all interconnected to bus 33 via user interface adapter 28, which may include, for example, a Super I/O chip integrating multiple device adapters into a single integrated circuit.

In exemplary embodiments, the processing system 300 includes a graphics processing unit 41. Graphics processing unit 41 is a specialized electronic circuit designed to manipulate and alter memory to accelerate the creation of images in a frame buffer intended for output to a display. In general, graphics processing unit 41 is very efficient at manipulating computer graphics and image processing and has a highly parallel structure that makes it more effective than general-purpose CPUs for algorithms where processing of large blocks of data is done in parallel.

Thus, as configured in FIG. 3, the system 300 includes processing capability in the form of processors 21, storage capability including system memory 34 and mass storage 24, input means such as keyboard 29 and mouse 30, and output capability including speaker 31 and display 35. In one embodiment, a portion of system memory 34 and mass storage 24 collectively store an operating system to coordinate the functions of the various components shown in FIG. 3.

Turning now to a more detailed description of aspects of the present invention, methods, systems, and computer program products for removing data having a data type from a data set. In exemplary embodiments, a set of templates for a data set are created by processing documentation that is associated with the data set. For example, in one embodiment, the data set is a log of messages generated by computing equipment and the documentation is a product document for the computing equipment that creates the log messages. In exemplary embodiments, the set of templates are used to annotate the data set with indications of data that belongs to a specific data type and these annotations are then used to create a modified log. Continuing with the above example, the annotations may indicate that values in the log include personally identifiable information that is governed by General Data Protection Regulations (GDPR), and the modified data set is created by replacing the personally identifiable information in the log.

Figure 4B:
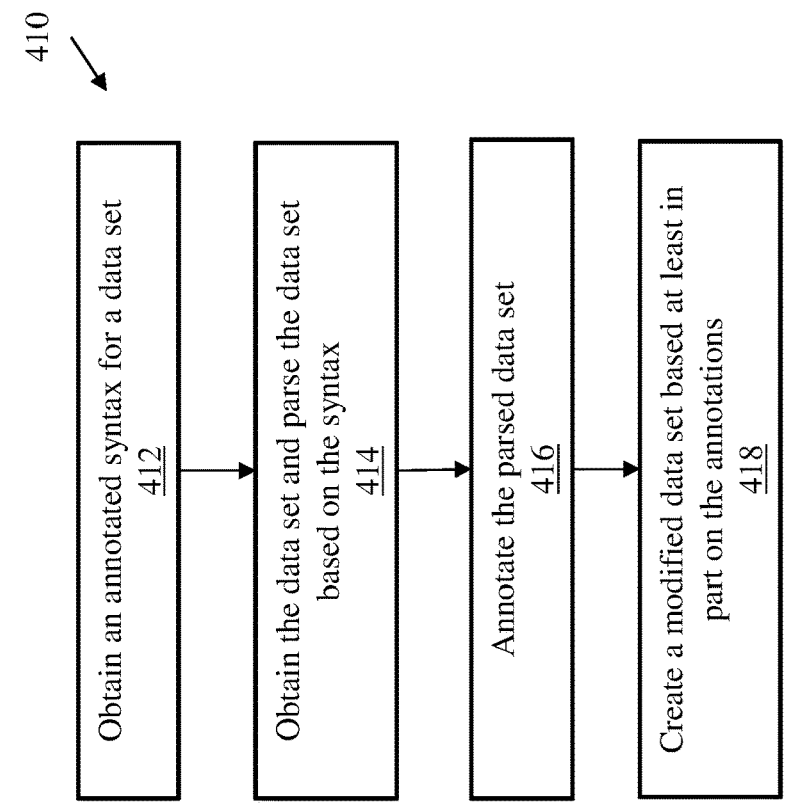
FIG. 4B depicts a flow diagram of a method for creating a modified data set according to one or more embodiments of the invention.
Figure 4A:
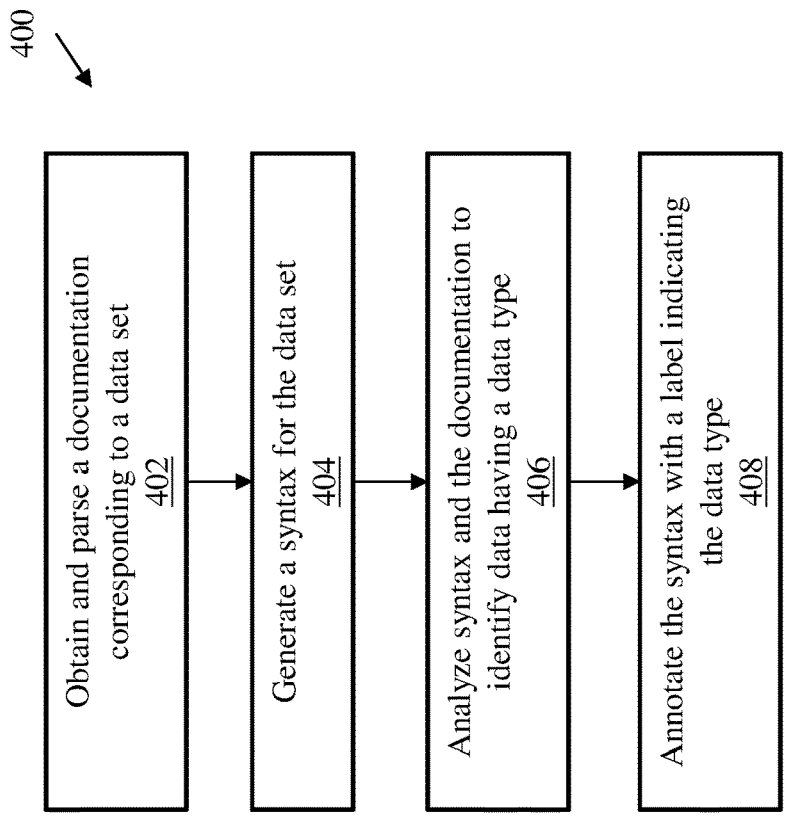
FIG. 4A depicts a flow diagram of a method for creating an annotated syntax based on data set documentation according to one or more embodiments of the invention.
Figure 5A:
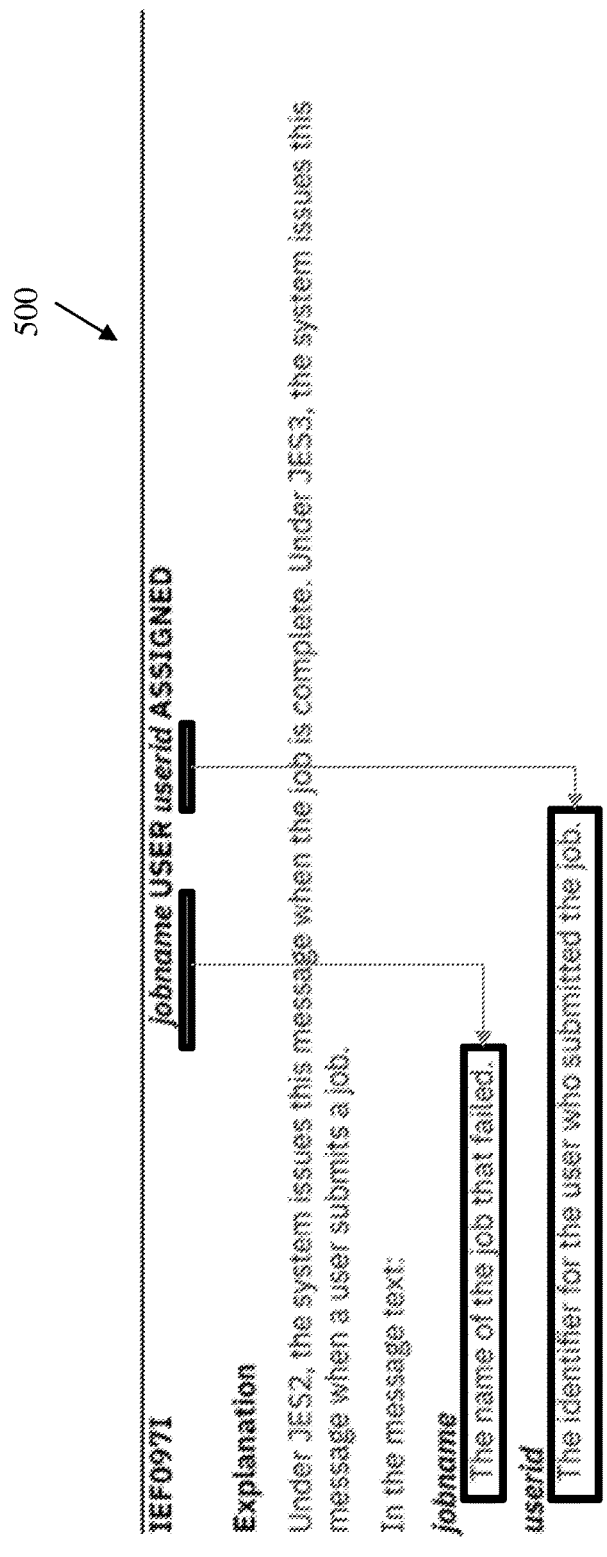
FIG. 5A depicts a portion of data set documentation according to embodiments of the invention.

Referring now to FIG. 4A a flow diagram of a method 400 for creating an annotated syntax based on data set documentation according to one or more embodiments of the invention is shown. As illustrated, the method 400 includes obtaining and parsing documentation corresponding to a data set, as shown at block 402. In exemplary embodiments, the parsing of the documentation includes performing natural language processing, dictionary lookup, and other machine learning techniques to the documentation. FIG. 5A depicts a portion of data set documentation 500 according to embodiments of the invention. Next, as shown at block 404, the method 400 includes generating a syntax for the data set. In exemplary embodiments, a syntax is a template of an entry in the data set and the syntax includes one or more parameters, which are one of constants and variables. The method 400 further includes analyzing the syntax and the documentation to identify data having a data type, as shown at block 406. In exemplary embodiments, identifying data having a data type includes performing natural language processing, dictionary lookup, and other machine learning techniques to the documentation. In one embodiment, the data type includes personally identifiable information. The method 400 concludes at block 408 by annotating the syntax with a label indicating the data type. In one embodiment, the annotations are applied to one or more variables of the syntax that correspond to values that include personally identifiable information.

Figure 5B:
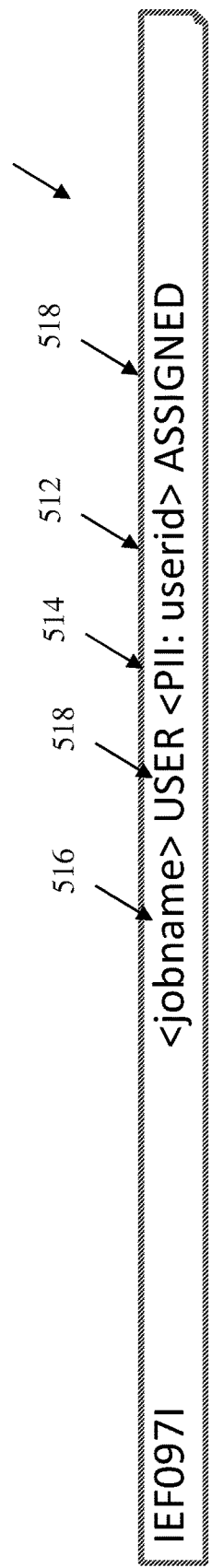
FIG. 5B depicts an annotated syntax according to one or more embodiments of the invention.

FIG. 5B depicts an annotated syntax 510 according to one or more embodiments of the invention. The annotated syntax 510 includes a variable 512 that includes an annotation 514, which indicates that the variable 512 belongs to a data type, such as personally identifiable information. The syntax also includes a variable 516 that has not been annotated and constants 518. In one embodiment, the annotated syntax 510 is created by applying the method 400 to the documentation 500. In exemplary embodiments, a user is able to provide an input of terms and corresponding data types that can be applied to the parsing of the documentation. In another embodiment, a user can manually identify data types from the documentation and/or manually annotate data from the data set and treat the machine annotated data differently from the manually annotated data.

Referring now to FIG. 4B a flow diagram of a method 410 for creating a modified data set according to one or more embodiments of the invention is shown. As illustrated, the method 410 includes obtaining the annotated syntax for a data set, as shown at block 412. In one embodiment, the annotated syntax is obtained from method 400 if the data provides documentation. In another embodiment, the annotated syntax is generated using template mining algorithm such as Drain3. Next, as shown at block 414, the method 410 includes obtaining the data set and parsing the data set based on the annotated syntax. The method 410 also includes annotating the parsed data set based on the annotated syntax. In exemplary embodiments, entries of the data set are compared to several annotated syntaxes to identify a match between an annotated syntax and the entry based on the content and structure of the text in the entry. Once a match is determined, the data in the entry is annotated based on the annotations of the corresponding annotated syntax. The method 410 concludes at block 418 by creating a modified data set based at least in part on the annotations. In one embodiment, creating the modified data includes removing all of the annotated data from the data set. In another embodiment, creating the modified data includes replacing each value of annotated data with a new value has a length and a syntax that match the length and the syntax of the original value.

Figure 6:
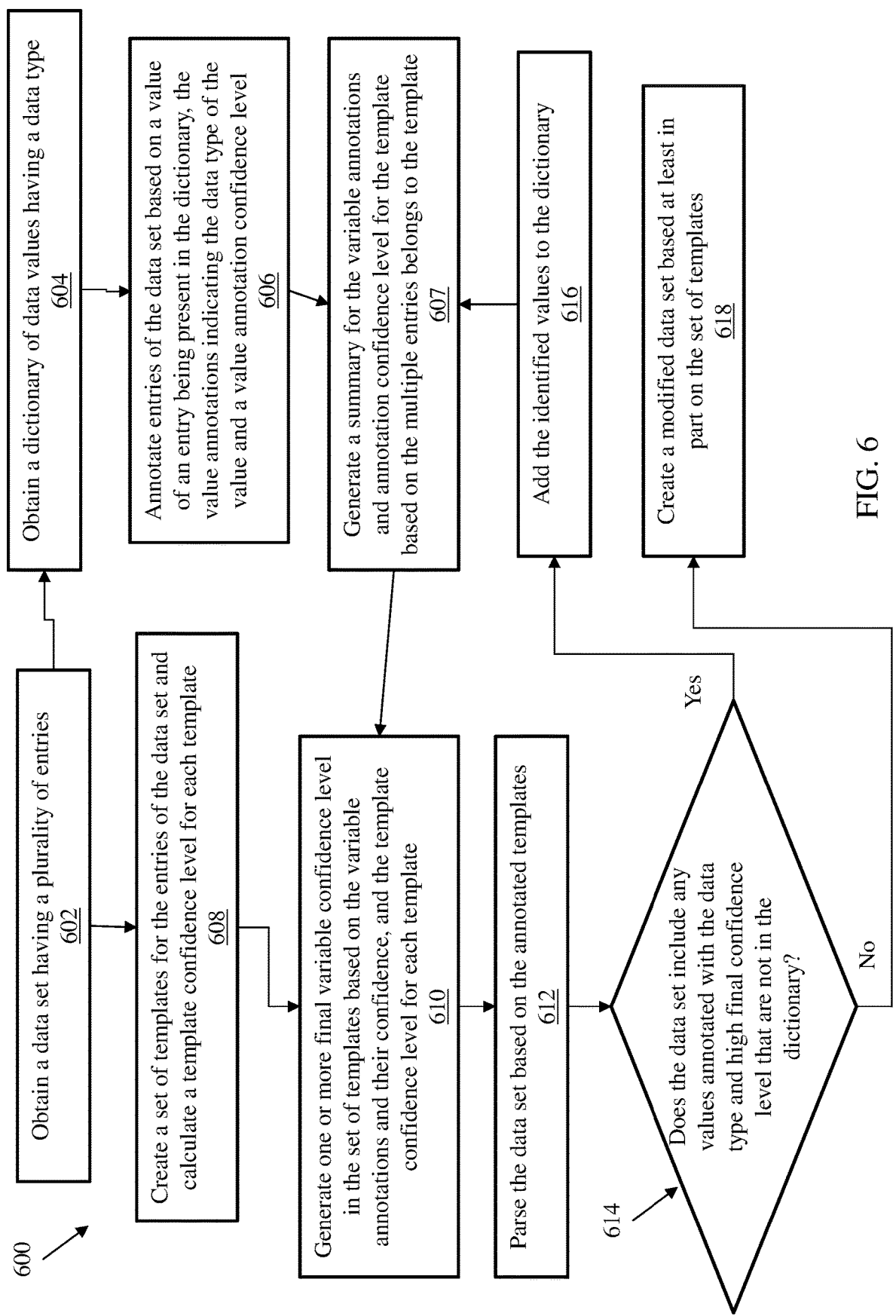
FIG. 6 depicts a flow diagram of a method for creating a modified data set according to one or more embodiments of the invention.

In some embodiments, a match between an annotated syntax and an entry of the data set is not identified or sufficient documentation is not available to generate an annotated syntax for the data set. In these cases, processing techniques are applied to the data set to create a set of annotated syntaxes for the data set. One such method 600 for creating a modified data set is shown in FIG. 6. As shown at block 602, the method 600 includes obtaining a data set having a plurality of entries. Next, as shown at block 604, the method 600 includes obtaining a dictionary of data values having a data type. In one embodiment, the data type is personally identifiable information, and the dictionary includes one or more of a list of names, user names, userIDs, email addresses, addresses, employee numbers, or similar personally identifiable information. Next, as shown at block 606, the method 600 includes annotating entries of the data set based on a value of an entry being present in the dictionary. In one embodiment, the annotations indicate the data type of the value and an annotation confidence level associated with the data type. For example, if the value is an exact match for an entry in the dictionary the annotation confidence level is 100% and if the value is a indirect match for an entry in the dictionary the annotation confidence level is 80%. In some explanatory embodiment, an exact match could be "Patrick has logoff from system", where Patrick is a name in the dictionary. An indirect match could be "User PATSPC logoff from system", where PATSPC wasn't in the dictionary, but a variable token following the constant "User" has a high likelihood of being a user identifier. There can be multiple different direct and indirect matching mechanism, and each could have a different confidence level. For each of the value corresponding to a variable based on the template, it can be associated with an annotation and an annotation confidence level.

Continuing with reference to FIG. 6, the method 600 also includes creating a set of templates for the entries of the data set and calculating a template confidence level for each template. In exemplary embodiments, each of the set of templates is a syntax that includes one or more parameters, which are one of constants and variables. In one embodiment, a template confidence level is determined based on the number and time-distribution of log messages used to generate the template. For example, the template confidence level is determined based on an amount of log messages used to generate (or belongs to) the template ($\alpha$). For example, the percentile of log messages belongs to this template, relative to a number of messages that belongs to other templates. The template confidence level is also determined based on a distribution of log messages used to generate the template ($\beta$). For example, a percentage of number of hourly interval that has log messages for the template. In addition, the template confidence level is further determined based on localized (concentrated) log messages within a narrower time period ($\epsilon$), which will be scaled to a value between 0-100. For example, based on a static threshold, such as "average of 50 times for intervals that have the message, and at least 3 intervals". In one embodiment, the template confidence level is calculated as: $\min(w0*(w1*\alpha+w2*\beta+w3*\epsilon), 100)$, where $w0, w1, w2, w3$ are weights with a value from 0-X. The weights will be determined based on the importance of the factors, and their value depends on the characteristic of the machine data and the specific use case. In exemplary embodiments, the minimization function is configured to limit the overall confidence level to 100.

In one embodiment, a low confidence level for a template indicates that a template was generated by a small number of entries in the data set or that the template was generated by entries in the data set that were concentrated in a small time interval, i.e., localized entries. In one embodiment, a high confidence level for a template indicates that a template was generated by a large number of entries in the data set and that the template was generated by entries in the data set spread across the entire time interval. In another embodiment, a high confidence level for a template indicates that a template was generated by entries in the data set that concentrated within a time period. For example, certificate security error could happen once in a while, with a "high amount of messages" within a short time period.

Continuing with reference to FIG. 6, the method 600 includes annotating one or more variables in the set of templates with a sensitivity category based on the annotations and their confidence level for each variable in the template and the template confidence level for each template, as shown at block 610. In exemplary embodiments, each template is assigned a confident level at block 608. Each value of a variable for entry in the data set will be annotated with a value annotation and a corresponding value annotation confidence level at Block 606. At block 607, with the multiple entries belongs to the same template, the entries' value annotations and value annotation confidence level will be summarized and became the variable annotation confident level in the template. At block 610, the annotations and their confidential level will be combined with the template confident level and a final variable confidence level is generated. In exemplary embodiments, the annotation includes a data type associated with a variable in an entry of the data set that matches the template. Once the set of annotated templates are created, at block 608, and annotated, at block 610, the method 600 proceeds to block 612 and parses the data set based on the annotated templates. As shown at decision block 614, the method 600 includes determining if the data set includes any values that are annotated with a data type and the data type has a high final confidence level that are not in the dictionary. This final annotation variable confidence level represents the confidence that this variable is mapped to the correct annotation. If the final variables annotation confidence level is high and a value that is annotated with a data type is not in the dictionary, the method 600 proceeds to block 616 and adds the value to the dictionary. In exemplary embodiments, these discovered values are assigned a confidence level that is lower than values that were originally located in the dictionary. Otherwise, the method 600 proceeds to block 618 and creates a modified data set based at least in part on the set of templates. In one embodiment, creating the modified data includes removing all of the annotated data from the data set. In another embodiment, creating the modified data includes replacing each value of annotated data with a new value that has a length and a syntax that match the length and the syntax of the original value. In another embodiment, after an annotated template is generated, values in additional entries will be replaced based on the final variable confidence level. If the final variable confidence level is high, all the values belong to the variable in all the entries will be replaced with the modified data, even if some individual entry might have a value with a low value annotation confidence level. In another embodiment, if the final variable confidence level is not high and the variable have a likelihood of belonging to the annotation, the values belong to the variables can be presented to the user for confirmation. In another embodiment, the user's feedback could be to annotate the variable in the template with specific annotation in the future, annotate the value in the dictionary with a specific annotation and confidence level. In another embodiment, based on the user's feedback, block 610 of method 600 could directly assigned the user provided variable annotation and confidence level without using the template confidence level at block 608 and the variable annotation confidence level at block 607.

Figure 7:
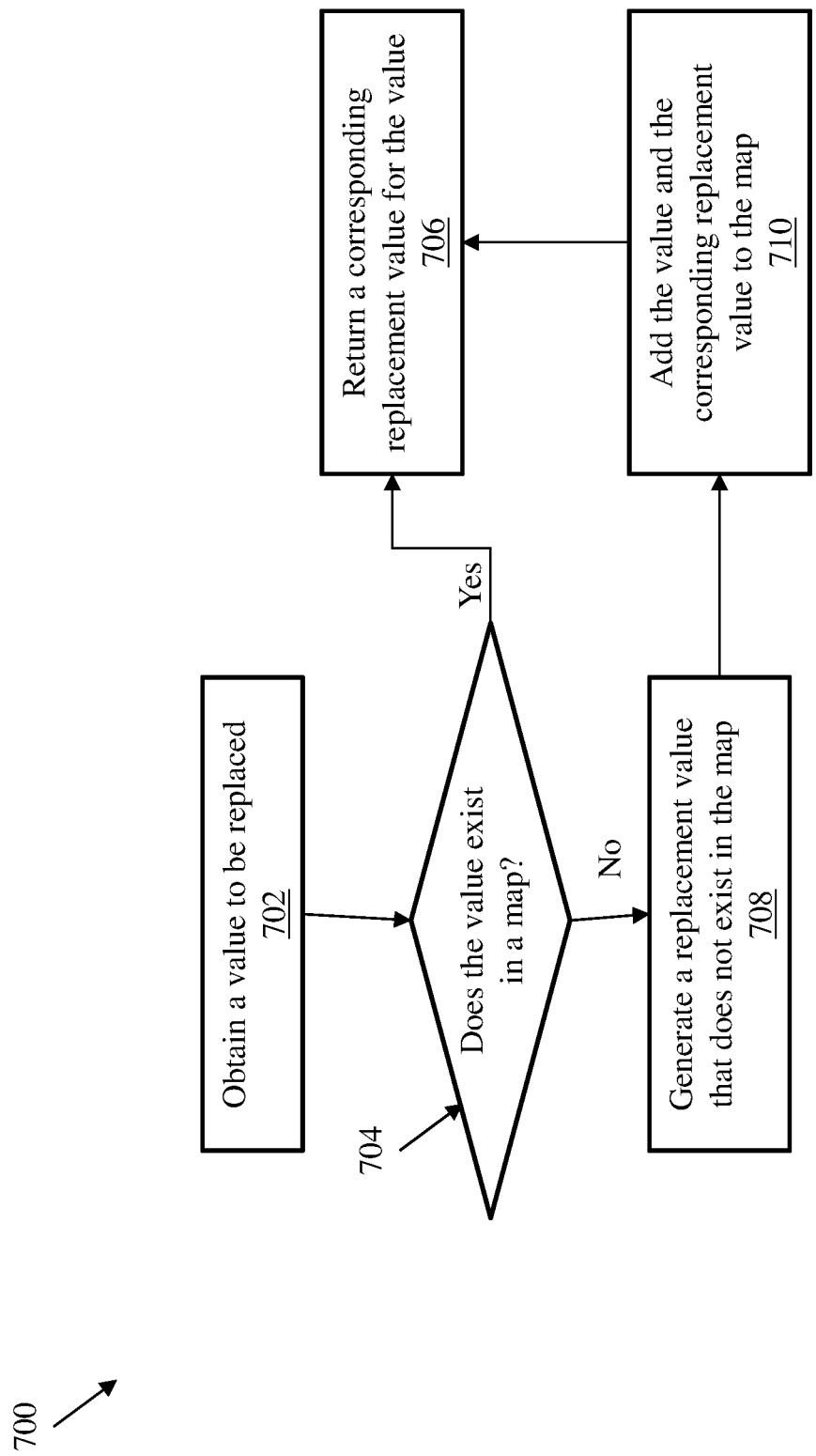
FIG. 7 depicts a flow diagram of a method for determining a replacement value for a value in a data set according to one or more embodiments of the invention.

Referring now to FIG. 7, a flow diagram of a method 700 for determining a replacement value for a value in a data set according to one or more embodiments of the invention. As shown at block 702, the method 700 includes obtaining a data value to be replaced. Next, as shown at decision block 704, the method 700 includes determining if the value exists in a map. In one embodiment, the map is a table that includes a correspondence between a value and a replacement value. If the value exists in the map, the method 700 proceeds to block 706 and returns a corresponding replacement value for the value. If the value does not exist in the map, the method 700 proceeds to block 708 and generates a replacement value that does not exist in the map. In exemplary embodiments, the replacement value has a length and a syntax that matches the value to be replaced. For example, if the value is 123-456, the replacement value will include three numbers a dash, and three other numbers. In another example, if the value is 1a2b3c then the replacement value will include a number, n character, another number, another character, another number, and another character. Next, as shown at block 710, the method 700 includes adding the value and the corresponding replacement value to the map. The method 700 the proceeds to block 706 and returns a corresponding replacement value for the value. In exemplary embodiments, the method 700 is configured to create a one-to-one and onto mapping between the original value and replacement value that is correlate-able across multiple entries within a data sets or entries across multiple data set that share a common map.

In exemplary embodiments, the methods for identifying personal information in a data set also include identifying and annotating variables/values in messages that correlate to variables/values that include identifying personal information. For example, a log message includes a username, which is identifying personal information, that executed a command and an IP address of where the command was initiated. In these cases, the IP address can have a strong correlation with the username because the user may only, or mainly, access the network from a single IP address. Accordingly, the username can be inferred by obtaining the IP address of a user. In exemplary embodiments, the data set is analyzed to identify variables/values in the entries that correlate to variables/values that are annotated as having a data type of interest, such as identifying personal information. Based on a determination that the entries that correlate to variables/values that are annotated as having a data type of interest, these variables/values are annotated with the data type and replaced.

In exemplary embodiments, block 412 in method 410 could handle other structured data, binary data such as a Database Table or C Struct. The template in this example will be used to separate and identify the variables within these structured data or binary data. For example, in a database table, each column will be the variable, each row of the table is an entry in the data set, the template is the table schema. In another example, in a C Struct, each field in the struct is a variable, each new instance of this Struct is an entry in the dataset, the C Struct is the template.

In exemplary embodiments, method 500 could be applied to the C Struct, where the C Struct typically come with code comments that describes the variable, or the Database Table, where the column name could contain meaningful hints on whether the data type is sensitive.

In exemplary embodiments, method 600 could be applied to the C Struct and database table, where the final sensitive level can be determined based on the values of the entries within the dataset. In exemplary embodiments, method 500 and method 600 can be used together. Method 500 could be used to generate a template and annotate the variables in the template with sensitivity level. By applying method 600 to the entries in the dataset, the values belong to highly sensitive variables can be added to the dictionary. Furthermore, method 600 can be used to identify additional variables that's highly sensitive. These additional variables might not be discovered by method 500 because the documentation might not provide sufficient information.

In exemplary embodiments, each value in the entry of the dataset can be annotated with multiple annotations, and each annotation will have its own value annotation confidence level. Similarly, each variable in the template can be annotated with multiple annotations, and each annotation will have its own value annotation confidence level. Furthermore, the dictionary could organize the values by the annotation, and there can be multiple annotations in the dictionary.

Technical benefits of removing data having a data type from a data set include the ability to automate compliance with GDPR. Furthermore, analyzing the documentation associated with a data set to create the templates used to greatly improves the accuracy of the ability to identify and remove or obscure personally identifiable information. As a result, the liability caused by a failure to comply with GDPR is reduced. In addition, the replacement of identified data values with one-to-one and onto replacement values permits continued analysis and use of the data set by algorithms designed to handle the original data.

Additional processes may also be included. It should be understood that the processes depicted in FIGS. 4A, 4B, 6 and 7 represent illustrations and that other processes may be added, or existing processes may be removed, modified, or rearranged without departing from the scope and spirit of the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for removing data having a data type from a data set, the method comprising:
    obtaining a data set;
    creating a set of templates based at least in part on processing a documentation associated with the data set, wherein the documentation is associated with one or more of pieces of equipment and software that write loci messages to the data set and wherein the documentation includes an explanation of a structure and content of the log messages written by the one or more pieces of equipment and software;
    obtaining the set of templates, wherein the annotating includes labeling each value of the variable in the data set with the data type; and
    creating an updated data set by replacing each value of the variable in the data set that is labeled with the data type with a new data value.

2. The computer-implemented method of claim 1, wherein the processing of the documentation includes performing natural language processing and dictionary lookup to identify one or more constants and one or more variables that define each template of the set of templates.

3. The computer-implemented method of claim 1, wherein each template of the set of templates includes an annotated syntax including an identification of the variable as the data type.

4. The computer-implemented method of claim 1, wherein the set of templates is created based on performing template mining on the data set.

5. The computer-implemented method of claim 4, wherein each template includes one or more annotated constants and one or more annotated variables.

6. The computer-implemented method of claim 5, wherein at least one of the one or more annotated variables is annotated as a data type and includes a confidence level associated with the annotation.

7. The computer-implemented method of claim 5, wherein the one or more one or more annotated variables are identified based on performing a lookup in a dictionary of data values in the data set and wherein the method further comprises adding data values labeled as the data type to the dictionary.

8. The computer-implemented method of claim 7, wherein the confidence level associated with the annotation is based at least in part on whether the at least one of the one or more annotated variables is present in the dictionary.

9. The computer-implemented method of claim 1, wherein the data type indicates a data field that includes personally identifiable information.

10. The computer-implemented method of claim 1, wherein replacing each value of the variable with the data type includes:
    determining whether the value is included in a mapping, based on determining that the value is not in the mapping, creating a new value, which does not exist in the mapping, and adding the new value to the mapping as a correlated value; and
    replacing the value with the correlated value from the mapping.

11. The computer-implemented method of claim 10, wherein new value has a length and a syntax that match the length and the syntax of the value.

12. The computer-implemented method of claim 1, wherein processing the documentation associated with the data set includes obtaining the documentation and generating a syntax for the data set.

13. A system comprising:
    a processor communicatively coupled to a memory, the processor configured to:
        obtain the data set;
        wherein a set of templates is created based at least in part on processing a documentation associated with the data set, wherein the documentation associated with one or more of pieces of equipment and software that write loci messages to the data set and wherein the documentation includes an explanation of a structure and content of the log messages written by the one or more pieces of equipment and software,
        obtain the set of templates, wherein one or more template of the set of templates includes a variable labeled as the data type;
        annotate the data set based on the set of templates, wherein the annotating includes labeling each value of the variable in the data set with the data type; and
        create an updated data set by replacing each value of the variable in the data set that is labeled with the data type with a new data value.

14. The system of claim 13, wherein the processing of the documentation includes performing natural language processing and dictionary lookup to identify one or more constants and one or more variables that define each template of the set of templates.

15. The system of claim 13, wherein each template of the set of templates includes an annotated syntax including an identification of the variable as the data type.

16. The system of claim 13, wherein the set of templates is created based on performing template mining on the data set.

17. The system of claim 16, wherein each template includes one or more annotated constants and one or more annotated variables.

18. The system of claim 17, wherein at least one of the one or more annotated variables is annotated as a data type and includes a confidence level associated with the annotation.

19. The system of claim 13, wherein processing the documentation associated with the data set includes obtaining the documentation and generating a syntax for the data set.

20. A computer program product for annotating a log based on processing log documentation comprising a non-transitory computer readable storage medium having program instructions embodied therewith, the program instructions executable by a processor to cause the processor to perform a method comprising:
    obtaining the data set;
    wherein a set of templates is created based at least in part on processing a documentation associated with the data set, wherein the documentation associated with one or more of pieces of equipment and software that write log messages to the data set and wherein the documentation includes an explanation of a structure and content of the loci messages written by the one or more of pieces of equipment and software;
    obtaining the set of templates, wherein one or more templates of the set of templates includes a variable labeled as the data type;
    annotating, the data set based on the set of templates, wherein the annotating includes labeling each value of the variable in the data set with the data type; and
    creating an updated data set by replacing each value of the variable in the data set that is labeled with the data type with a new data value.

* * * * *